(12) United States Patent
Joshi et al.

(10) Patent No.: US 10,904,078 B2
(45) Date of Patent: Jan. 26, 2021

(54) SYSTEMS AND METHODS FOR AUTONOMOUS CREATION OF A DOMAIN SPECIFIC INDUSTRIAL INTERNET OF THINGS GATEWAY USING A CONVERSATIONAL INTERFACE

(71) Applicant: Honeywell International Inc., Morris Plains, NJ (US)

(72) Inventors: Ramchandra Joshi, Montville, NJ (US); Karthick Sengodan, Tamilnadu (IN); Kirupakar Janakiraman, Tamilnadu (IN)

(73) Assignee: Honeywell International Inc., Charlotte, NC (US)

( * ) Notice: Subject to any disclaimer, the term of this patent is extended or adjusted under 35 U.S.C. 154(b) by 175 days.

(21) Appl. No.: 16/033,280

(22) Filed: Jul. 12, 2018

(65) Prior Publication Data

US 2020/0021488 A1 Jan. 16, 2020

(51) Int. Cl.
| | |
|---|---|
| *H04L 12/24* | (2006.01) |
| *H04L 29/08* | (2006.01) |
| *H04L 12/58* | (2006.01) |
| *G06F 9/445* | (2018.01) |
| *G06F 40/30* | (2020.01) |

(52) U.S. Cl.
CPC ...... *H04L 41/0806* (2013.01); *G06F 9/44505* (2013.01); *G06F 40/30* (2020.01); *H04L 51/02* (2013.01); *H04L 67/34* (2013.01)

(58) Field of Classification Search
CPC .................................................. H04L 41/0806
See application file for complete search history.

(56) References Cited

U.S. PATENT DOCUMENTS

| | | |
|---|---|---|
| 2016/0065653 A1 | 3/2016 | Chen et al. |
| 2016/0328216 A1 | 11/2016 | Leonelli et al. |
| 2017/0192414 A1* | 7/2017 | Mukkamala ........ G06F 3/04883 |

FOREIGN PATENT DOCUMENTS

WO 2018/009205 A1 1/2018

* cited by examiner

*Primary Examiner* — Moustafa M Meky
*Assistant Examiner* — Sm Z Islam
(74) *Attorney, Agent, or Firm* — Bookoff McAndrews, PLLC

(57) ABSTRACT

Systems and methods are disclosed for executing a conversational interface for autonomous assembly and configuration of an Industrial Internet of Things (IIoT) gateway. Methods comprise generating and transmitting, to a user over an electronic network, a plurality of questions regarding hardware and/or software assembly and configuration of an IIoT gateway; receiving, from the user over the electronic network, responses to the plurality of questions; generating a service specification in a domain specific language based on the received responses, the service specification identifying a plurality of services to be assembled on the IIoT gateway; generating, for each identified service of the generated service specification, a configuration specification in the domain specific language, each configuration specification defining a protocol of the respective identified service; and transmitting the configuration specification, to the user over the network, to enable the user to read, access, and download components listed in the configuration specification for installation on the IIoT gateway.

20 Claims, 7 Drawing Sheets

US 10,904,078 B2

SYSTEMS AND METHODS FOR AUTONOMOUS CREATION OF A DOMAIN SPECIFIC INDUSTRIAL INTERNET OF THINGS GATEWAY USING A CONVERSATIONAL INTERFACE

TECHNICAL FIELD

Various embodiments of the present disclosure relate generally to Industrial Internet of Things (IIoT) systems and networks. More specifically, this disclosure relates to autonomous assembly and configuration of a domain specific gateway for use in an IIoT system or network.

BACKGROUND

Industrial process control and automation systems are routinely used to automate large or complex industrial processes. These systems have evolved from closed proprietary systems in the early 1990s to more convenient, connected, and open systems now. The current trend involves (i) moving these systems to cloud computing environments and (ii) using Industrial Internet of things (IIoT) devices within these systems.

In today's IIoT world, IIoT providers direct their focus towards connecting devices, extracting data from those devices, and sending the data to the cloud for analytics. In conventional systems, IIoT gateways involve manual assembly and configuration. For example, human effort is involved to understand which services are required on the gateway and when they are required. A consultation from an IIoT architect is then performed in order to pick the correct set of physical components to be deployed in the node. As such, manual selection of such nodal components might be inaccurate. Furthermore, a user typically manually builds the components to generate the runtime image of the IIoT node gateway that could be redundant and time consuming. A review is also performed by a security expert in order to select, install, and configure the correct set of security subsystems. As such, this can lead to inefficiency, substantial manual effort, and high configuration costs.

The present disclosure is directed to overcoming one or more of these above-referenced challenges.

SUMMARY OF THE INVENTION

According to certain aspects of the disclosure, systems and methods are disclosed for assembling and configuring an Industrial Internet of Things (IIoT) gateway in an IIoT network to perform one or more functions.

In one embodiment, a computer-implemented method is disclosed for executing a conversational interface for autonomous assembly and configuration of an Industrial Internet of Things (IIoT) gateway. The computer-implemented method includes: generating and transmitting, to a user over an electronic network, a plurality of questions regarding hardware and/or software assembly and configuration of an IIoT gateway; receiving, from the user over the electronic network, responses to the plurality of questions; generating a service specification in a domain specific language based on the received responses, the service specification identifying a plurality of services to be assembled on the IIoT gateway; generating, for each identified service of the generated service specification, a configuration specification in the domain specific language, each configuration specification defining a protocol of the respective identified service; and transmitting the configuration specification, to the user over the network, to enable the user to read, access, and download components listed in the configuration specification for installation on the IIoT gateway.

In accordance with another embodiment, a computer system is disclosed for executing a conversational interface for autonomous assembly and configuration of an Industrial Internet of Things (IIoT) gateway. The computer system comprises: a memory having processor-readable instructions stored therein; and at least one processor configured to access the memory and execute the processor-readable instructions, which when executed by the processor configures the processor to perform a plurality of functions, including functions for: generating and transmitting, to a user over an electronic network, a plurality of questions regarding hardware and/or software assembly and configuration of an IIoT gateway; receiving, from the user over the electronic network, responses to the plurality of questions; generating a service specification in a domain specific language based on the received responses, the service specification identifying a plurality of services to be assembled on the IIoT gateway; generating, for each identified service of the generated service specification, a configuration specification in the domain specific language, each configuration specification defining a protocol of the respective identified service; and transmitting the configuration specification, to the user over the network, to enable the user to read, access, and download components listed in the configuration specification for installation on the IIoT gateway.

In accordance with another embodiment, a non-transitory computer-readable medium is disclosed for executing a conversational interface for autonomous assembly and configuration of an Industrial Internet of Things (IIoT) gateway. The non-transitory computer-readable medium having instructions stored thereon that, in response to instructions by a computer-based system, cause the computer-based system to perform operations comprising: generating and transmitting, to a user over an electronic network, a plurality of questions regarding hardware and/or software assembly and configuration of an IIoT gateway; receiving, from the user over the electronic network, responses to the plurality of questions; generating a service specification in a domain specific language based on the received responses, the service specification identifying a plurality of services to be assembled on the IIoT gateway; generating, for each identified service of the generated service specification, a configuration specification in the domain specific language, each configuration specification defining a protocol of the respective identified service; and transmitting the configuration specification, to the user over the network, to enable the user to read, access, and download components listed in the configuration specification for installation on the IIoT gateway.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description.

As described above, there is a need in the field of industrial processes for systems and methods for assembling and configuring an Industrial Internet of Things (IIoT) gateway in an IIoT network via the cloud. The following systems and methods provide more precise insight into processes and components that aid in the execution of a conversational interface for autonomous assembly and configuration of an IIoT gateway.

FIGS. 1 through 7, discussed below, and the various embodiments used to describe the principles of the present disclosure in this patent document are by way of illustration only and should not be construed in any way to limit the scope of the invention. Those skilled in the art will understand that the principles of the disclosure may be implemented in any type of suitably arranged device or system.

Figure 1:
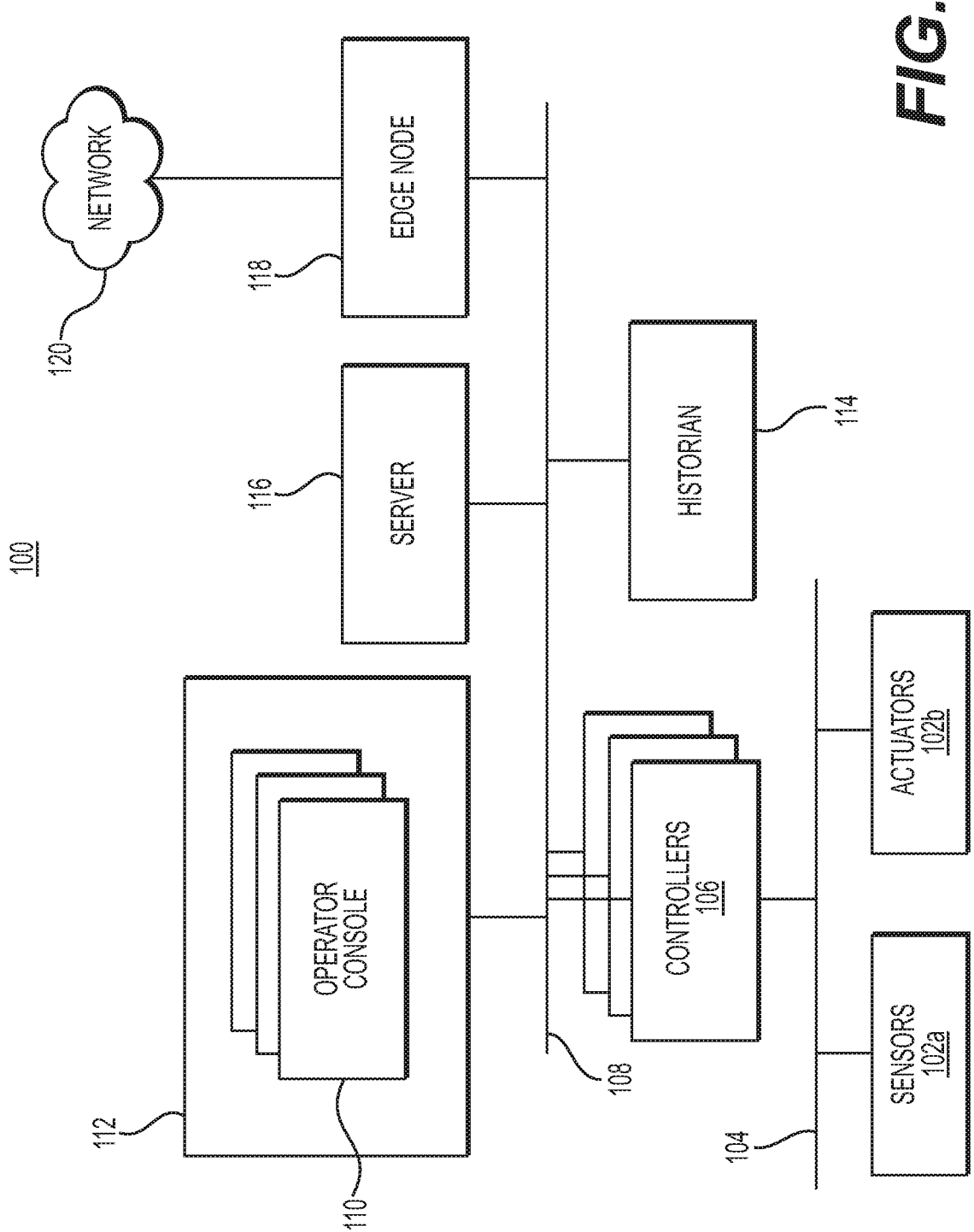
FIG. 1 illustrates an example industrial process control and automation system, according to one or more embodiments.

FIG. 1 illustrates an example industrial process control and automation system 100, according to one or more embodiments. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as flow, pressure, or temperature. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s). In accordance with this disclosure, the network 104 could represent all or a portion of a network of Industrial Internet of Things (IIoT) devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

In one embodiment, at least one network 108 couples the controllers 106 and other devices in the system 100. The network 108 facilitates the transport of information between components. The network 108 could represent any suitable network or combination of networks. As particular examples, the network 108 could represent at least one Ethernet network. In accordance with this disclosure, the network 108 could represent all or a portion of a network of IIoT devices. In one embodiment, network 104 and/or network 108 form part of the same network, such as network 120, which may be referred to as "the cloud," which may or may not form part of and/or be in communication with the Internet.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could request information affecting how the industrial process is controlled, such as by requesting setpoints or control modes for process variables controlled by the controllers 106 or other information that alters or affects how the controllers 106 control the industrial process. This could include requesting this information from the controllers 106 or from other devices such as historian 114 or servers 116. In response to such requests, each operator console 110 could receive the requested information. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud or a remote server communicatively coupled to the control and automation system 100.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where a conversational interface for autonomous assembly and configuration of an IIoT gateway can be used. This functionality can be used in any other suitable system.

Figure 2:
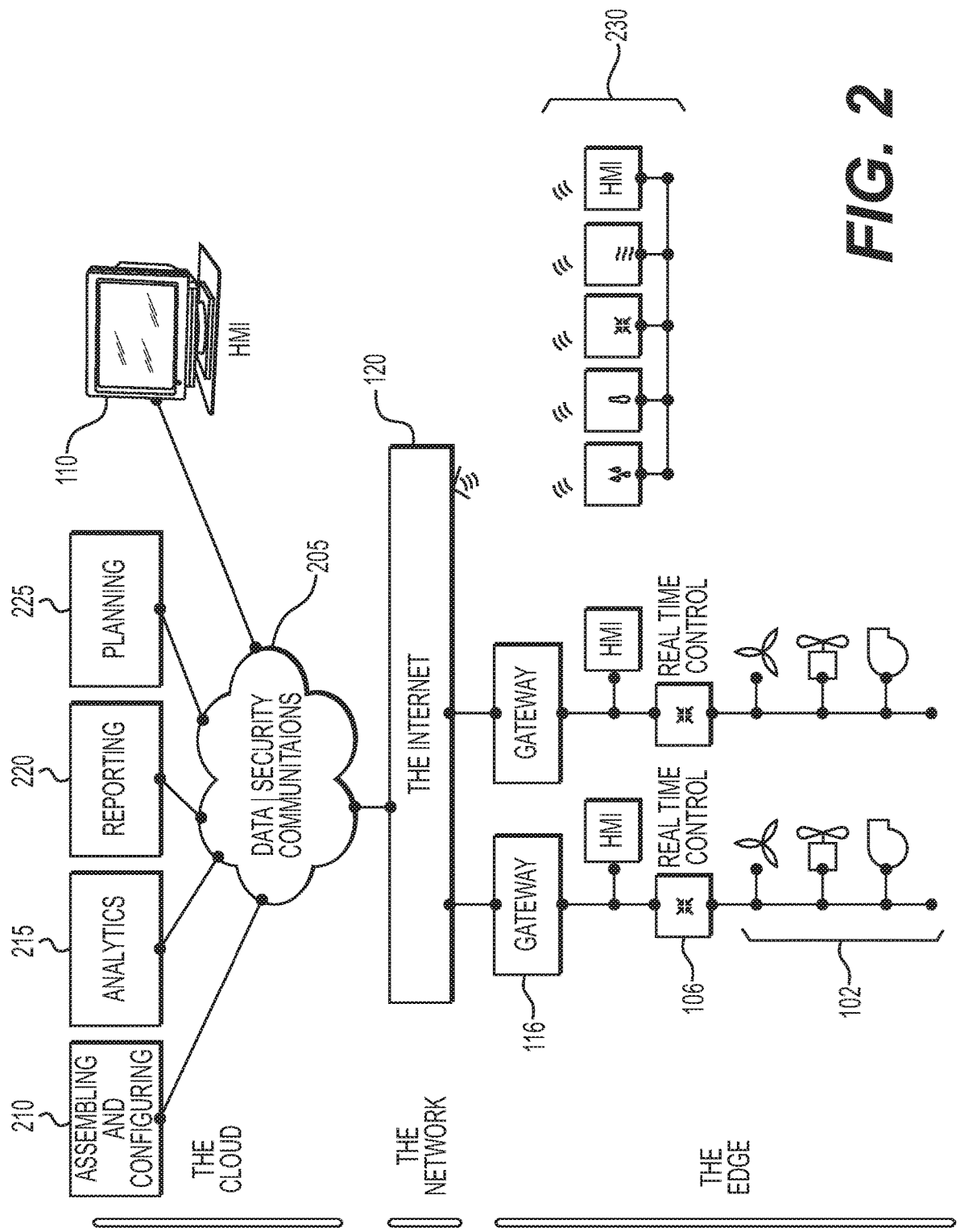
FIG. 2 illustrates components of an Industrial Internet of Things (IIoT) environment, according to one or more embodiments.

FIG. 2 illustrates components of an Industrial Internet of Things (IIoT) environment, according to one or more embodiments. As shown in FIG. 2, an IIoT environment may be organized in three primary layers (Cloud, Network, and the Edge).

As shown in FIG. 2, the edge layer may include one or more sensors, actuators, or other devices 102, real time controllers 106, gateways 116, and a human-machine interface 110. Real time controllers 106 may control one or more smart network ready devices 230. The network layer may include any suitable wired or wireless network, such as, for example, a local area network (LAN), wide area network (WAN), Ethernet, wireless fidelity (Wi-Fi), IEEE 802.11, Bluetooth or other short-range radio communication, near field communication, etc. The cloud layer may include data and security communications modules 205, modules for assembling and configuring 210, analytics 215, reporting 220, and planning 225, and a human machine interface 110. The assembling and configuration module 210 will be explained in more detail with respect to FIG. 5, below.

Figure 3:
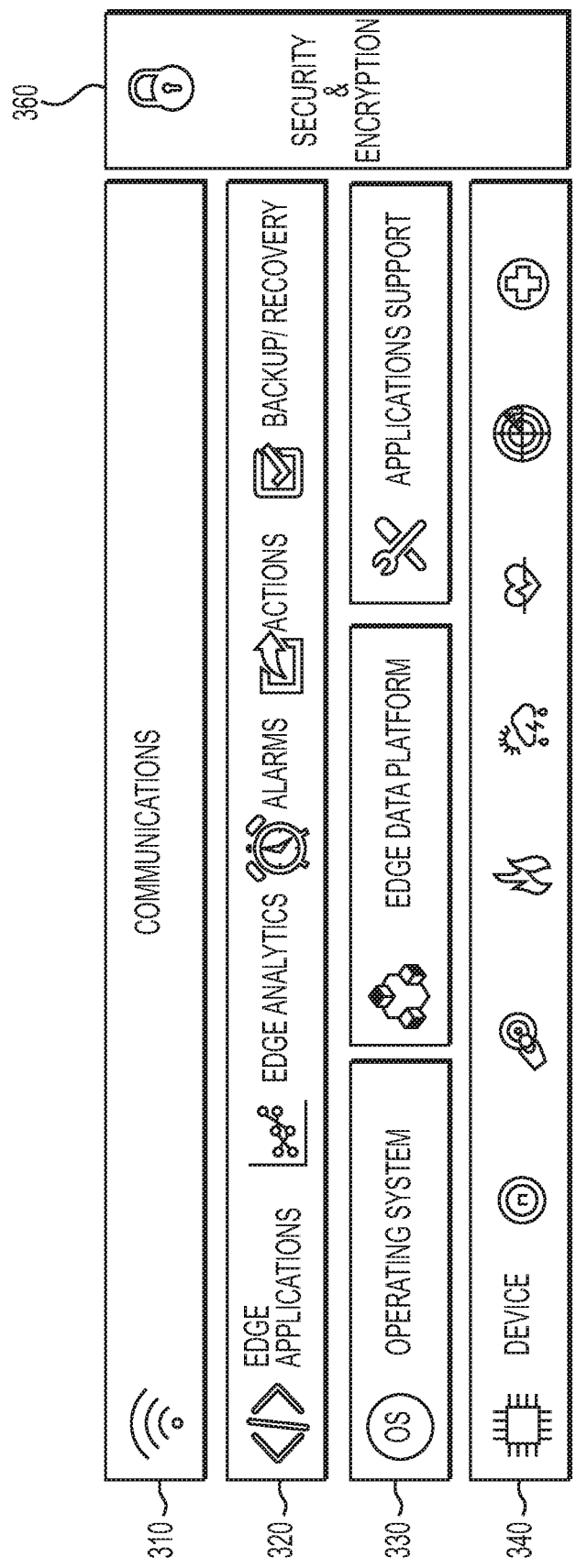
FIG. 3 illustrates an exemplary platform of device thru communications architecture layers of an Industrial Internet of Things (IIoT) environment, according to one or more embodiments.

As shown in FIG. 3, the edge node IIoT platform may generally include multiple layers, including a communications layer 310, an applications layer 320, an operating system layer 330, and devices interface layer 340. Security and encryptions layer 360 may extend among and between the plurality of layers of the edge node IIoT platform.

In one embodiment, the edge node software may include an operating system 330, a data storage and management platform, application support, a security and encryption module 360, a communications module 310, and interfaces 340 for one or more connected devices. The edge node may contain a pre-determined set of applications 320, such as analytics, alarm management, and backup/recovery. Typically, a configuration of which devices will connect to the node may be planned before deploying an edge node. Devices may connect to the edge node using protocols such as ZigBee, Z-Wave, BLE, OPC UA, BACNet, and the like.

Figure 4:
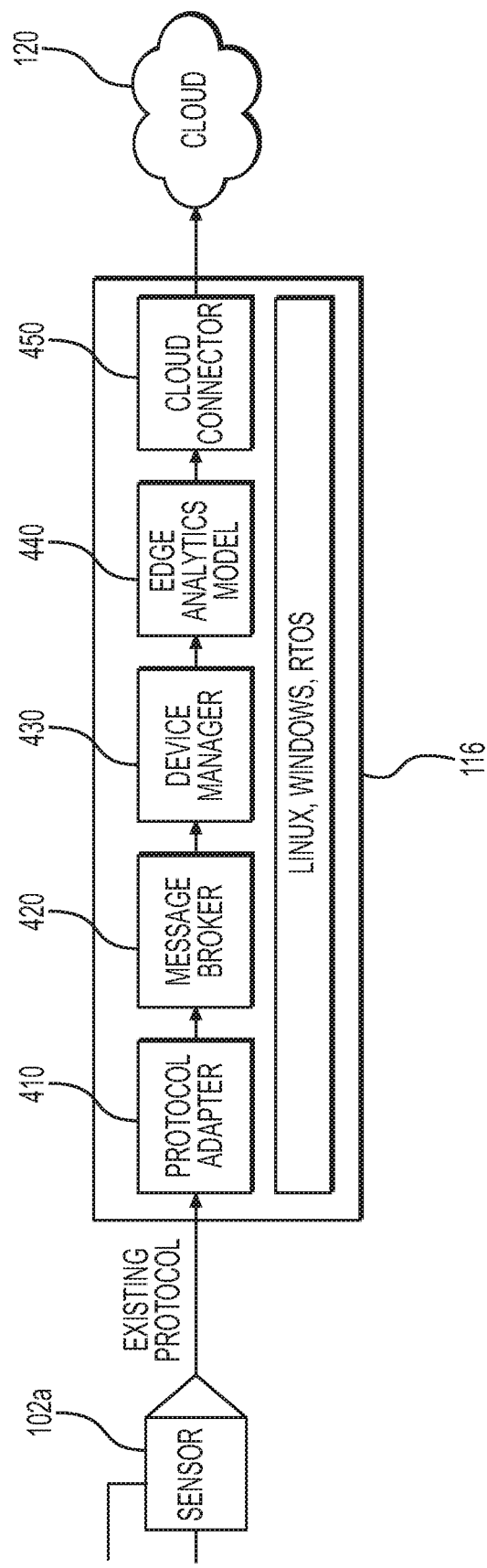
FIG. 4 illustrates an exemplary architecture between a plurality of sensors, a server, and the cloud of an Industrial Internet of Things (IIoT) platform, according to one or more embodiments.

As shown in FIG. 4, an IIoT server 116 or edge node 118 may include functional modules such as, for example, a protocol adapter 410, a message broker 420, a device manager 430, an analytics model 440, and a cloud connector 450. These functional modules may be connected by a service bus (not shown), and further provided in communications between a plurality of sensors (e.g., one or more sensors 102a) and the cloud 120.

In existing systems, behavioral aspects of these modules, such as those listed below, may be totally static. That is, the physical organization and bindings of the modules, the interaction between the modules, data communication between the modules, resource consumption of the modules, etc., may not be available for modification after deployment of the edge node. In other words, the modules may typically be tightly coupled and packaged for a common deployment scenario.

According to one or more embodiments, the edge layer may receive incoming data streams from a plurality of devices such as, sensors 102a and gateways 116. From a machine learning perspective, the process of receiving data packets from those components, can be interpreted as a function of time, which is exponentially distributed as explained below.

In one embodiment, data inter arrival time s=IID (Independent and Identically Distributed Random Variables) and exponentially distributed, where the number of data arrivals n over a given interval (t, t+1, t+2) has a Poisson distribution. Incoming Data arrival is a Poisson process or a Poisson stream.

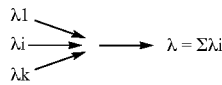

If the arrival of data stream to a single gateway with exponential service time are Poisson with mean rate λ, the departures are also Poisson with the same rate λ provided λ<μ.

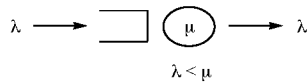

μ=Mean service rate per gateway
λ=Mean arrival rate of data stream

According to queueing theory, and as per the representation in the above-mentioned diagram the service times for the incoming Poisson events will also be independently and identically distributed (IIDs) random variables. Hence it becomes complex to pre define the systems behavior over various circumstances since the arrival rate and service rate cannot be predicted accurately.

From the IIoT edge context the demand response can be defined as, dynamic scaling or modification of the application behavior based upon certain events. These events can be:

Incoming Sensor data
Device Flow control rate
Resource Utilization
Performance implications and so on Since the data arrival rate is highly stochastic in nature it may be difficult to define a static behavior model for these attributes. Currently there is very limited intelligence available at the edge to understand the demand response of the system and create the applications according to that.

Figure 5:
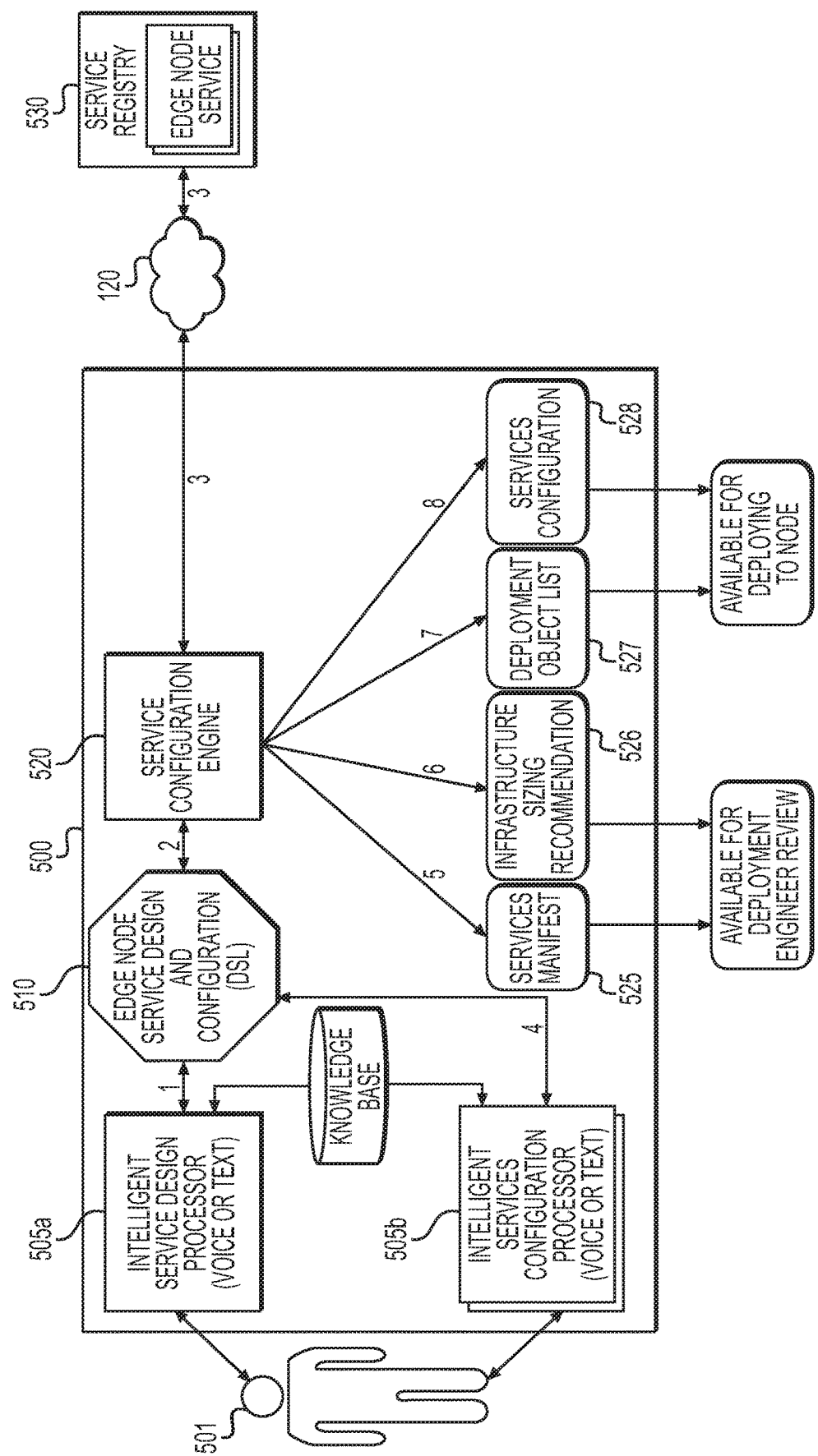
FIG. 5 illustrates a block diagram of an exemplary system for autonomously assembling and configuring a gateway in an Industrial Internet of Things (IIoT) environment, according to one or more embodiments.

FIG. 5 illustrates a block diagram of an exemplary system for autonomously creating and configuring an gateway in an Industrial Internet of Things (IIoT) environment. Specifically, FIG. 5 depicts three main components of an exemplary assembling and configuring module 210 (as shown in FIG. 2) including, for example, an Intelligent Service Design Processor (ISDP) 505a, an Intelligent Service Configuration Processor (ISCP) 505b, and service registry of recipes 530.

The ISDP 505a may be responsible for processing human input. Specifically, ISDP 505a may be an intelligent component built using cognitive technology, such as a BOT service, and natural language understanding (NLU) that can recognize what the user means based on input that may not always be sufficient or complete. Based upon the user query, the ISDP 505a refines the following aspects from the conversation:

Intent (e.g. need to fabricate the IIoT gateway image)
Entities (e.g. embedded device, C++ environment)
Factors (e.g., BACnet support, OTA, Yocto Linux)
Conditions (e.g. maximum space complexity of 1 GB)

ISDP 505a may then create a service specification in an IoT domain language (e.g., Sentience Domain Language). The service specification identifies the services required (e.g., how devices will be connected and controlled, what kind of field bus protocol(s) will be used, which machine learning models will be used, what model will be used for predictive analysis, etc.) in the node. The ISDP 505a also advises the user of the CPU, memory, and storage required.

The ISCP 505b may be an intelligent component that helps the user configure each service identified by the ISDP 505a. The ISCP 505b may be specific to each service and may create a configuration specification in an IIoT domain language (e.g., Sentience Domain Language). For example, if MQTT is the communication protocol identified to communicate to the devices, then ISCE 505b may identify the number of MQTT channels to be supported, the bandwidth requirement for each MQTT channel, etc.

The metadata that is used to fabricate or create the IIoT gateway components can be maintained in an index-based repository within a service registry 530, as "recipes." The recipes may be reused for the fabrication of the IIoT gateway requests with similar factors or requirements.

The intelligent component selection may use principle component analysis (PCA) techniques to refine the required components from a catalog of recipes in the edge or cloud. In some embodiments, any desired IIoT platform may be used to select a component using the following process:

Use weighted sum of parameters to classify the components.

Let xij denote the ith parameter for the jth component.

IoT platform assigns weights wi's such that yj's provide the maximum discrimination among the components.

The quantity yj is called the principal factor.

The factors are ordered. The first factor explains the highest percentage of the variance. Statistically:

a. The y's are linear combinations of x's:

$$y_i = \Sigma_{j=1}^{n} a_{ij} x_j$$

Here, ajj is called the loading of variable xj on factor yi.

b. The y's form an orthogonal set, that is, their inner product is zero:

$$<y_i, y_j> = \Sigma_k a_{ik} a_{kj} = 0$$

This is equivalent to stating that y's are uncorrelated to each other.

c. The y's form an ordered set such that y1 explains the highest percentage of the variance in resource demands. This is the key component that can be picked for the desired SDL expression that has been supplied.

A typical PCA executed by the ISCP 505b in order to pick the right components for the user's gateway requirements can look similar to the following Table 1:

TABLE 1

| | PCA for component selection | | | | |
|---|---|---|---|---|---|
| Components | X1 Reqmt 1 | X2 Reqmt 2 | X3 Reqmt 3 | X4 Reqmt 4 | X5 Reqmt 5 |
| Z1 Cloud Connector | 1.577 | 39.17 | 0.908 | 80.7 | 32.6 |
| Z2 Firmware Management Lib | 5.878 | 7.54 | 0.687 | 73 | 46.9 |
| Z3 File Upload Lib | 1.632 | 3.41 | 0.547 | 64.7 | 36.8 |
| Z4 Bacnet Lib | 1.48 | 19.84 | 0.755 | 65.5 | 39.9 |
| Z5 OPC US Lib | 0.223 | 56.69 | 0.866 | 80 | 42.5 |
| Z6 Open SSL 1.0.2.n | 14.527 | 46.86 | 0.91 | 78.3 | 40.8 |
| Z7 LibCurl 1.58 | 5.05 | 9.001 | 0.06 | 0.05 | 50.05 |

FIG. 5 further depicts an assembly and configuration management server 500, a cloud network 120, and a service registry 530. The overall solution architecture flow will now be described, with reference to FIG. 5:

1. A user 501 engages in a conversation with one or more processors 505 via text or voice. In the exemplary embodiment, the user 501 is a deployment engineer and the user 501 first converses with Intelligent Service Design Processor (ISDP) 505a. As described above, ISDP 505a may refine the intent, factors, entity, and condition from the user's conversation and determines the types of services desired by the user 501. In one embodiment, the one or more processors 505 may be BOTs with cognitive capabilities. The one or more processors 505 may work with the help of a knowledge base that is configured to contain:
 a. Rules
 b. Source code repository
 c. Repository with release binaries
 d. Configuration files
 e. Build process scripts
 f. Other supporting scripts for creating and configuring an IIoT gateway 2. ISDP 505a may produce a services specification, as part of the gateway service design and configuration 510, in an IoT domain specific language (e.g., Sentience Domain Specific Language). The specification may identify all the services desired in the gateway.

3. A service configuration engine (SCE) 520 may consult the service registry 530 through the cloud 120 and identify the service details, such as dependencies, CPU, memory, and storage requirements.

4. The user 501 again converses with the one or more processors 505. In the exemplary embodiment, the user 501 now converses with the Intelligent Services Configuration Processor (ISCP) 505b. The ISCP 505b asks questions to the user 501 and then creates the configuration information, as part of the gateway service design and configuration 510, in an IoT domain specific language (e.g., Sentience Domain Specific Language).

5. Service configuration engine ("SCE") 520 produces a services manifest 525 (i.e., a list of services that should be installed in the gateway based upon the PCA, described above). For example, the manifest could contain a list of services, such as:
 a. MQTT broker
 b. Data pipeline
 c. Complex event processing
 d. Down-sampling
 e. Cloud connector
 f. Bulk file upload 6. SCE 520 may also produce an infrastructure sizing recommendation 526 for the gateway infrastructure including CPU, memory, and storage requirements. Both the services manifest 525 and the infrastructure sizing recommendation 526 may be available for the user 501 to review. A sample recommendation 526 for the IIoT gateway could be as follows:
 a. Yocto kernel
 b. 8 core ARM CPU
 c. 8 GB RAM
 d. 1 GB storage
 e. 1 GB network interface
 f. Code space desired: 655 Mbytes. Spare capacity: 345 Mbytes
 g. Virtual machine acceptable. Physical machine not necessarily required.

7. Based on the prepared manifest 525, SCE 520 may prepare a deployment object list ("DOL") 527. For instance, one service may contain multiple docker containers. The DOL 527 may contain the list of objects (e.g., containers) to be downloaded from the service registry 530. A sample DOL 527 can be as follows:
 a. MQTT broker
  i. MQTT broker container image file
  ii. MQTT client container image file
 b. Data pipeline
  i. Data pipeline services container
 c. Complex Event Processing (CEP)
  i. CEP engine container
 d. Analytics services container
  i. Down-sampling container
  ii. Anomaly detection container
  iii. Aggregation services container
 e. Cloud Connector
  i. Cloud Connector service container
 f. Bulk file upload
  i. Bulk file upload service client container 8. Based upon the input by the user 501, SCE 520 may prepare a services configuration 528. The services configuration 528 may be a configuration file or a fabricated image file with all the binaries packaged together in the form of an .img file. The services configuration 528 can be downloaded to the node, so that each service receives the configuration data it needs.

The user 501 then provisions the recommended hardware and software configuration for the IIoT gateway. The installer software running on the IIoT gateway accesses the configuration management server 210 through the network 120 and downloads the DOL 527 and the services configuration file 528. The installer software then accesses the service registry 530 and downloads all the components listed in the DOL 527. Each component in the DOL 527 is started and reads the configuration file 528 at the time of initialization. The process of installing and starting the node is now complete.

A sample dialog between the user 501 and the ISDP 505a is as follows:
 ISDP: Hello, what is the industry domain you want your gateway to work in?
 User: Oil refinery
 ISDP: How will devices send data to the gateway?
 User: MQTT and OPC/UA
 ISDP: Good. Do you want analytics performed on the data received?
 User: Yes. Basic aggregation
 ISDP: Good. Do you want to support any machine learning models?
 User: Yes. Is predictive analytics possible?

ISDP: Yes. Logistics regression and linear regression models are available

User: What is the difference between linear and logistics regression?

ISDP: In linear regression, the outcome is continuous. For example, it could be the price of a house based on the land area and the size of the dwelling. In logistic regression, the outcome has only a limited number of possible values, for example Yes or No.

User: For my data, I will choose linear regression

ISDP: What type of data do you want to send to Sentience IoT Platform?

User: Only anomaly data should be sent to Sentience IoT Platform

ISDP: Any other requirements?

User: No, that's all at this time

ISDP: Thank you. A requirements specification will be created based on your input. Please come back again and review A sample dialog between the user 501 and the ISCP 505b is as follows:

ISCP: Hello, what service do you want to configure?

User: MQTT Broker

ISCP: How many MQTT channels do you want to configure?

User: I will have 8 devices connect to the gateway

ISCP: Good. Do you want secure communication?

User: Yes

ISCP: Do you have certificates issued by a CA?

User: No

ISCP: What is the rate at which devices will send data?

User: It could be has high as 1000 samples per second

ISCP: Does any data contain any Personally Identifiable Information (PII)?

User: No

ISCP: Thank you. Device configuration will be created based on your input. Please come back again and review.

Figure 6:
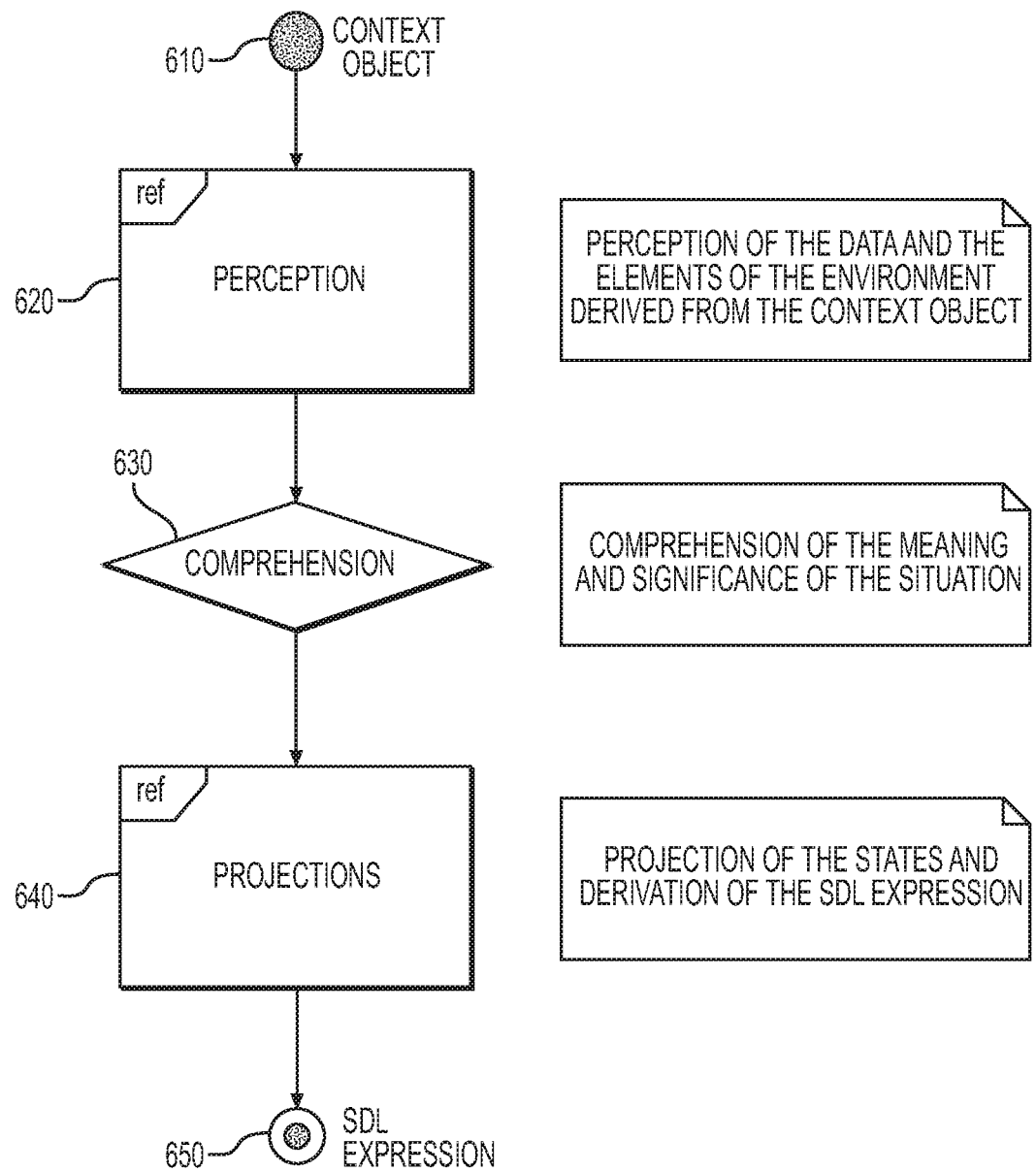
FIG. 6 illustrates a flow chart of an exemplary method of perception, comprehension, and projection between stats of an IIoT domain language, according to one or more embodiments.

FIG. 6 depicts a method for derivation of an IoT domain language (e.g., a Sentience Domain Language ("SDL")) expression. It should be appreciated that although the present specification and drawings describe the SDL domain language, any IoT domain language and associated expression is contemplated within the scope of the present application and claims. In one embodiment, the IoT expression or SDL expression is a regular expression that includes attributes representing the system context, which can be decoded by an IoT platform service configuration engine to become situation-aware. Any IoT domain language (e.g., a Sentience Domain Language ("SDL")) may include core context objects in different fields, such as:

Connected buildings domain aspects
Connected workers domain aspects
Connected freight
Connected aero domain aspects
Connected homes domain aspects Based upon the context object that has been derived from the above-mentioned parameters, a three-step process can be performed towards refining the IoT domain language (e.g., SDL) expression.

Some aspects of the IoT domain language (e.g., SDL) expression include:

Lambda-based notations to carry the payload of more than one or group of metadata information. Typically, a lambda expression is an anonymous function that can be used to create delegates or expression tree types.

Encoded/cryptic in a form that only a service configuration engine can decode the expression.

IoT domain language (e.g., SDL) expressions are translative, i.e., arithmetic operations can be performed between them.

IoT domain language (e.g., SDL) expressions can be given as input factors for a training set to generate a hypothesis based thereupon. This training can happen either in the edge or in the cloud.

Figure 7:
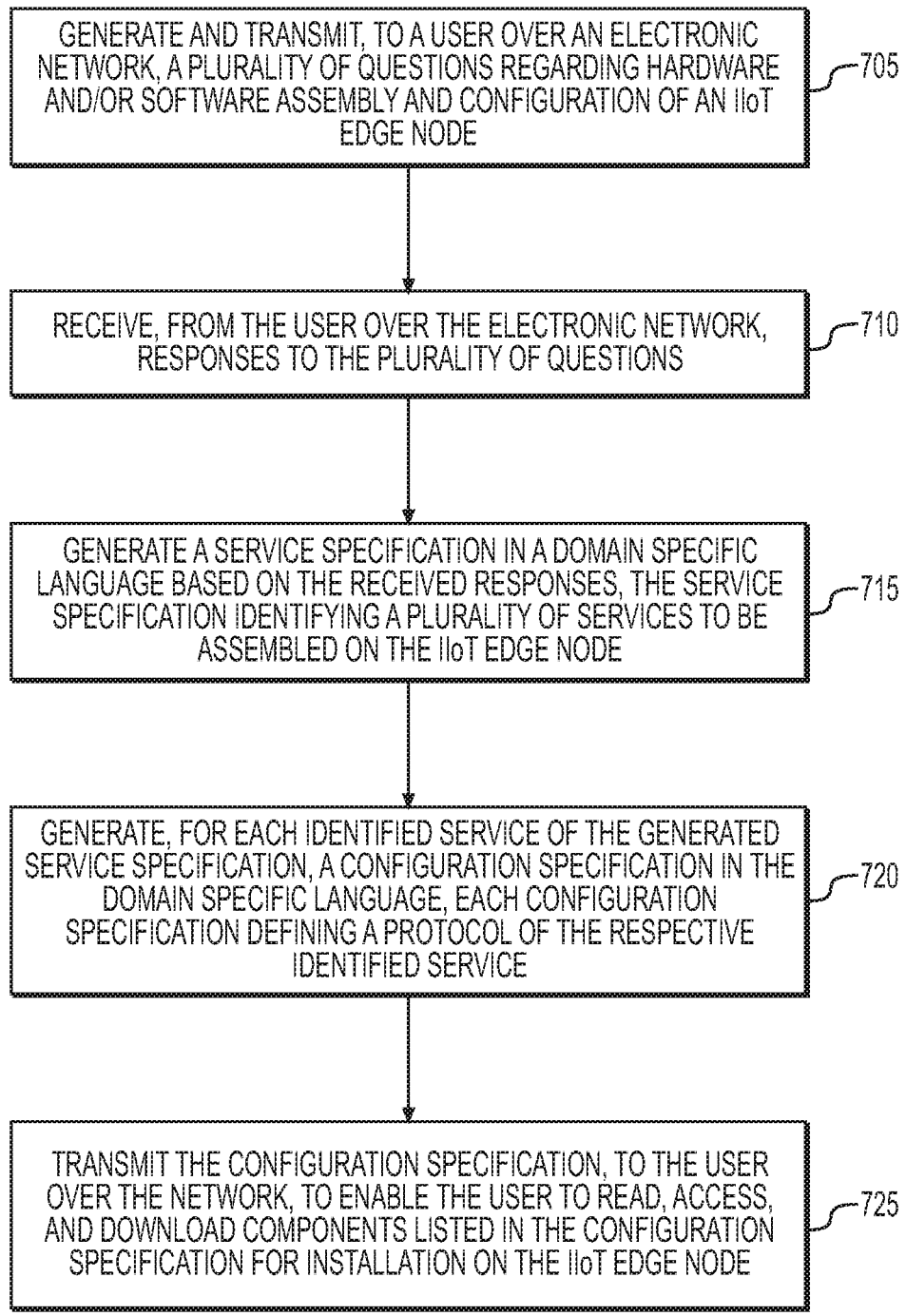
FIG. 7 illustrates a flow chart of an exemplary method for executing a conversational interface for autonomous assembly and configuration of an IIoT gateway, according to one or more embodiments.

FIG. 7 illustrates a flow chart of an exemplary method 700 for executing a conversational interface for autonomous assembly and configuration of an IIoT gateway, according to one or more embodiments.

In the method 700, a computer generates and transmits, to a user over an electronic network, a plurality of questions regarding hardware and/or software assembly and configuration of an IIoT gateway (Step 705). The computer then receives responses to the plurality of questions from the user (Step 710). A service specification is then generated in a domain specific language based on the received responses (Step 715). The service specification identifies a plurality of services to be assembled on the IIoT gateway. For each identified service of the generated service specification, the computer generates a configuration specification in the domain specific language (Step 720). Each configuration specification defines a protocol of the respective identified service. Lastly, the computer transmits the configuration specification to the user over the network to enable the user to read, access, and download components listed in the configuration specification for installation on the IIoT gateway (Step 725).

The following table summarizes some issues that occur in typical IIoT gateways and how each issue is addressed by the disclosed systems and methods.

TABLE 2

IIoT gateway Issues, Solutions, and Advantages

| | Issue | Solution | Advantages |
|---|---|---|---|
| 1 | The deployment engineer is required to have expert knowledge of available edge services. It is hard to find people with expert knowledge about all aspects of the edge services | The deployment engineer simply answers questions that a BOT asks. The BOT can be programmed to determine domain specific questions. | Use of BOT technology to conversationally determine the deployment requirements. |
| 2 | A recommendation about the infrastructure | A recommendation about the infrastructure is provided | Automatic generation of the |

TABLE 2-continued

IIoT gateway Issues, Solutions, and Advantages

| | Issue | Solution | Advantages |
|---|---|---|---|
| | requirements (e.g. CPU, memory, and storage) is needed. | automatically. | recommendation. |
| 3 | Without any tools, service planning takes days and months and extensive testing is required after the solution is developed. | Automated solution to create a domain specific IIoT gateway. | Domain specific experience is not needed to create an IIoT gateway. |
| 4 | Automation in producing the configuration file reduces the guesswork and trial and error. | Configuration file is produced automatically, which improves productivity. | Use of BOT technology to create the configuration file. |
| 5 | Since every domain and industry has a unique set of requirements, it is difficult to have a human with expert understanding of all the nuances within a certain industry. | No domain expertise is needed in crafting the IIoT gateway solution. | Use of BOT technology to create an IIoT gateway, sizing and infrastructure recommendation and configuration. |

Example

An IIoT gateway is set up on the manufacturing shop floor to run simple stream analytics for handling real-time data that is generated by a machine. The solution deployment architect needs to consider the types of machines the node will connect to, how each machine will send data, the types of analytical models that are required to process the data, how the node will connect to the cloud, etc. The solution deployment architect has to manually identify all the services required, configure the services, and make sure the node functions correctly. The disclosed systems and methods utilize a BOT which will ask the user (in this case, the solution deployment architect) questions about which devices the node will read/write data from/to, which protocol(s) will be used, which types of analytics are desired, and which type of data will go to the cloud. Based on the user's answers to the questions, the BOT will create a specification for the services to be configured using a domain specific language (DSL). A service configuration engine will interpret the specified configuration and create instructions for the correct software services to be loaded in the gateway. Thus, the desired gateway software will be created and composed automatically.

Below are some potential advantages of the conversational approach for automatic creation of a domain specific gateway:

Autonomous way of creating a script that downloads all the software components needed in a domain specific gateway.

A resource recommendation is created by asking the deployment engineer questions about the IIoT gateway functionality. The recommendation informs the deployment engineer about CPU, memory, and storage resources needed.

A configuration file for the IIoT gateway is created conversationally (i.e. by asking specific questions about the functions and features needed).

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for executing a conversational interface for autonomous assembly and configuration of an Industrial Internet of Things (IIoT) gateway, the method comprising:
generating and transmitting, by at least one processor, to a user over an electronic network, a plurality of questions regarding hardware and/or software assembly and configuration of an IIoT gateway;
receiving, by the at least one processor, from the user over the electronic network, responses to the plurality of questions;
automatically generating, by the processor, a service specification in a domain specific language based on the received responses, the service specification identifying a plurality of services to be assembled on the IIoT gateway;
automatically generating, by the processor, for each identified service of the generated service specification, a configuration specification in the domain specific language, each configuration specification defining a protocol of the respective identified service; and
transmitting, by the processor, the configuration specification, to the user over the network, to enable the user to read, access, and download components listed in the configuration specification for installation on the IIoT gateway.

2. The method of claim 1, wherein the step of generating and transmitting the plurality of questions comprises using a conversational interface involving one or more of a natural language understanding processor, artificial intelligence, and/or cognitive bot service.

3. The method of claim 1, wherein the plurality of questions comprise requests for information regarding devices the IIoT gateway will read/write data from/to, any protocol(s) that will be used to process data, types of analytics desired, and or types of data that will be transmitted to the cloud.

4. The method of claim 1, further comprising using a service configuration engine to interpret, by the at least one processor, the specified configuration specification to create instructions for suitable software services to be installed on the gateway;
  wherein the plurality of questions comprise requests for information regarding configuration intent, relevant entities, implicated factors, and relevant conditions.

5. The method of claim 1, wherein the service specification defines CPU, memory, and storage usage required by the desired configuration; and
  wherein the plurality of services of the generated service specification comprise one or more of MQTT broker, data pipeline, complex event processing, down-sampling, cloud connector, bulk file upload, protocol adapter, message broker, device manager, and edge analytics model.

6. The method of claim 1, further comprising automatically generating, by the at least one processor, the service specification based on the received responses by accessing, by the at least one processor, a knowledge base comprising one or more of: dependencies, rules, a source code repository, an repository of release binaries, configuration files, build process scripts, and supporting scripts for creating and configuring IIoT gateways.

7. The method of claim 1, further comprising storing, by the at least one processor, the generated configuration specifications as a recipe in an index-based repository of other configuration specifications stored as known recipes.

8. The method of claim 7, further comprising, using a recipe stored in the index-based repository of recipes to automatically generate, by the at least one processor, a configuration specification for each identified service of a service specification for which a similar recipe is stored in the repository.

9. The method of claim 7, further comprising using a service specification in the domain specific language and a stored recipe to automatically generate, by the at least one processor, a list of components or services to configure in the IIoT gateway.

10. A computer system for executing a conversational interface for autonomous assembly and configuration of an Industrial Internet of Things (IIoT) gateway, comprising:
  a memory having processor-readable instructions stored therein; and
  at least one processor configured to access the memory and execute the processor-readable instructions, which when executed by the processor configures the processor to perform a plurality of functions, including functions for:
  generating and transmitting, to a user over an electronic network, a plurality of questions regarding hardware and/or software assembly and configuration of an IIoT gateway;
  receiving, from the user over the electronic network, responses to the plurality of questions;
  automatically generating a service specification in a domain specific language based on the received responses, the service specification identifying a plurality of services to be assembled on the IIoT gateway;
  automatically generating, for each identified service of the generated service specification, a configuration specification in the domain specific language, each configuration specification defining a protocol of the respective identified service; and
  transmitting the configuration specification, to the user over the network, to enable the user to read, access, and download components listed in the configuration specification for installation on the IIoT gateway.

11. The system of claim 10, wherein the step of generating and transmitting the plurality of questions comprises using a conversational interface involving one or more of a natural language understanding processor, artificial intelligence, and/or cognitive bot service.

12. The system of claim 10, wherein the plurality of questions comprise requests for information regarding devices the IIoT gateway will read/write data from/to, any protocol(s) that will be used to process data, types of analytics desired, and or types of data that will be transmitted to the cloud.

13. The system of claim 10, wherein the processor is further configured to perform a plurality of functions comprising using a service configuration engine to interpret the specified configuration specification to create instructions for suitable software services to be installed on the gateway;
  wherein the plurality of questions comprise requests for information regarding configuration intent, relevant entities, implicated factors, and relevant conditions.

14. The system of claim 10, wherein the service specification defines CPU, memory, and storage usage required by the desired configuration; and
  wherein the plurality of services of the generated service specification comprise one or more of MQTT broker, data pipeline, complex event processing, down-sampling, cloud connector, bulk file upload, protocol adapter, message broker, device manager, and edge analytics model.

15. The system of claim 10, wherein the processor is further configured to perform a plurality of functions comprising automatically generating the service specification based on the received responses by accessing a knowledge base comprising one or more of: dependencies, rules, a source code repository, an repository of release binaries, configuration files, build process scripts, and supporting scripts for creating and configuring IIoT gateways.

16. The system of claim 10, wherein the processor is further configured to perform a plurality of functions comprising storing the generated configuration specifications as a recipe in an index-based repository of other configuration specifications stored as known recipes.

17. The system of claim 16, wherein the processor is further configured to perform a plurality of functions comprising, using a recipe stored in the index-based repository of recipes to automatically generate a configuration specification for each identified service of a service specification for which a similar recipe is stored in the repository.

18. The system of claim 16, wherein the processor is further configured to perform a plurality of functions comprising using a service specification in the domain specific language and a stored recipe to automatically generate a list of components or services to configure in the IIoT gateway.

19. A non-transitory computer-readable medium containing instructions for executing a conversational interface for autonomous assembly and configuration of an Industrial Internet of Things (IIoT) gateway, comprising:
  generating and transmitting, by at least one processor, to a user over an electronic network, a plurality of questions regarding hardware and/or software assembly and configuration of an IIoT gateway;
  receiving, by the at least one processor, from the user over the electronic network, responses to the plurality of questions;
  automatically generating, by the at least one processor, a service specification in a domain specific language based on the received responses, the service specification identifying a plurality of services to be assembled on the IIoT gateway;

automatically generating, by the at least one processor, for each identified service of the generated service specification, a configuration specification in the domain specific language, each configuration specification defining a protocol of the respective identified service; and transmitting, by the at least one processor, the configuration specification, to the user over the network, to enable the user to read, access, and download components listed in the configuration specification for installation on the IIoT gateway.

20. The non-transitory computer-readable medium of claim 19, wherein the step of generating and transmitting the plurality of questions comprises using a conversational interface involving one or more of a natural language understanding processor, artificial intelligence, and/or cognitive bot service.

* * * * *